(12) United States Patent
Chen et al.

(10) Patent No.: US 7,551,842 B2
(45) Date of Patent: Jun. 23, 2009

(54) VIDEO PLAYER SYSTEM AND METHOD OF PLAYBACK CONTROL USING SUBTITLE INFORMATION

(75) Inventors: Yu-Chi Chen, Hsinchu (TW);
Wen-Kuan Chen, Hsinchu (TW);
Ying-Chih Yang, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 764 days.

(21) Appl. No.: 10/882,213

(22) Filed: Jul. 2, 2004

(65) Prior Publication Data
US 2005/0152680 A1 Jul. 14, 2005

(30) Foreign Application Priority Data
Jan. 12, 2004 (TW) ............... 93100708 A

(51) Int. Cl.
*H04N 7/26* (2006.01)
(52) U.S. Cl. .......................... 386/124; 386/46
(58) Field of Classification Search ............ 386/46, 386/52, 55, 68–70, 95, 112, 125, 126, 98, 386/111; 345/418, 719; 348/468, 569, 906; 360/5
See application file for complete search history.

(56) References Cited

U.S. PATENT DOCUMENTS

| | | | | |
|---|---|---|---|---|
| 5,684,542 A | * | 11/1997 | Tsukagoshi | 348/468 |
| 5,848,217 A | * | 12/1998 | Tsukagoshi et al. | 386/68 |
| 5,987,214 A | * | 11/1999 | Iwamura | 386/95 |
| 6,046,778 A | * | 4/2000 | Nonomura et al. | 348/565 |
| 6,104,861 A | * | 8/2000 | Tsukagoshi | 386/95 |
| 6,754,435 B2 | * | 6/2004 | Kim | 386/69 |
| 2003/0068158 A1 | * | 4/2003 | Kudou | 386/95 |
| 2003/0190147 A1 | * | 10/2003 | Lee | 386/70 |
| 2004/0047589 A1 | * | 3/2004 | Kim | 386/46 |

OTHER PUBLICATIONS

"Timeline of Closed Captioning Development," Federal Communications Commission, http://www.fcc.gov/cgb/dro/cctimeline.html.*
Hollings et al., Television Decoder Circuiry Act of 1990, Jul. 10, 1990.*
"Timeline of Closed Captioning Development," Federal Communications Commission, http://www.fcc.gov/cgb/dro/cctimeline.html, 1971.*

* cited by examiner

*Primary Examiner*—Thai Tran
*Assistant Examiner*—Mishawn Dunn
(74) *Attorney, Agent, or Firm*—Finnegan, Henderson, Farabow, Garrett & Dunner LLP

(57) ABSTRACT

A system for playing video data and audio data and displaying subtitles includes a subtitle analyzer for analyzing the subtitles and providing subtitle display time, a controller for providing playback control signals based on the subtitle display time from the subtitle analyzer, a video decoder decoding the video data, an audio decoder decoding the audio data, a player for playing the decoded video data and the decoded audio data according to the playback control signals. A method for playing video data and audio data and displaying subtitles includes analyzing the subtitles and providing subtitle display time, providing playback control signals based on the subtitle display time, decoding the video data and the audio data, and playing the decoded video data and the decoded audio data according to the playback control signals.

30 Claims, 8 Drawing Sheets

VIDEO PLAYER SYSTEM AND METHOD OF PLAYBACK CONTROL USING SUBTITLE INFORMATION

FIELD OF THE INVENTION

This invention generally relates to a method and system for video playback and, more particularly, to a method and system for video playback control using subtitle information.

BACKGROUND OF THE INVENTION

For video playback of digital information on a digital video disk ("DVD"), the DVD player uses an audio decoder, video decoder and sub-picture decoder for playing back and respectively decoding audio, video and sub-picture information stored in a DVD.

FIG. 1 is a schematic view of a hardware structure of a DVD player 10. DVD player 10 includes a main controller 11, de-multiplexer 12, decoder 13, audio post processor 14, audio output 15, video post processor 16, video output 17, user interface 18 and controller 19. Based on user-input information, controller 19 transmits playback control signals to main controller 11. After main controller 11 reads the video information based on the playback control signals from controller 19, main controller 11 transmits audio, video, and sub-picture information, through de-multiplexer 12, respectively to audio decoder 131, video decoder 132, and sub-picture decoder 133. Main controller 11 can also receive subtitle information for screen display, e.g., for different language subtitles. A DVD can also selectively provide video information such as text data through a "Line-21" coupled between video decoder 132 and video post processor 16. "Line-21" is a type of data lines that is suitable for transmitting standardized format data according to Electronic Industries Association or EIA-608.

Sub-picture decoder 133 outputs corresponding subtitle images, generally in a bitmap format, based on decoded subtitle image display data (including, e.g., time, position, and color balance). After video post processor 17 receives subtitle images from sub-picture decoder 133, it combines the subtitle images with images output from video decoder 132. Audio decoder 131, video decoder 132, and sub-picture decoder 133 determine output timing according to a system clock, such as a video and audio data clock.

A conventional DVD player receives control signals for, e.g., fast and slow playback, reverse fast and slow playback, and playback at specific locations. These playback functions are dependent on playback information, image display time or audio output time of main controller 11. Playback timing cannot be controlled based on subtitle images.

There is thus a need in the art for a DVD system and method with flexible timing control for DVD playback and, more particularly, for a DVD system and method with improved timing control for playback based on subtitle image data.

SUMMARY OF THE INVENTION

In accordance with the invention, there is provided a playback system method for playing video and audio data based on subtitle image data and a control method therefor.

In accordance with the present invention, there is provided a system for playing video data and audio data and displaying subtitles comprising a subtitle analyzer for analyzing the subtitles and providing subtitle display time, a controller for providing playback control signals based on the subtitle display time from the subtitle analyzer, a video decoder for decoding the video data, an audio decoder for decoding the audio data, a player for playing the decoded video data and the decoded audio data according to the playback control signals.

In accordance with the present invention, there is also provided a method for playing video data and audio data and displaying subtitles comprising analyzing the subtitles and providing subtitle display time, providing playback control signals based on the subtitle display time, decoding the video data and the audio data, and playing the decoded video data and the decoded audio data according to the playback control signals.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts.

Different decoders decode and output audio, video and subtitle information stored in a digital video disk. Each sub-picture includes one or more display data of subtitle images. Through analysis of display data for the sub-pictures, audio and video playback can advantageously be performed for specific subtitle images upon user demand in accordance with the principles of the present invention set forth in further detail herein.

Figure 1:
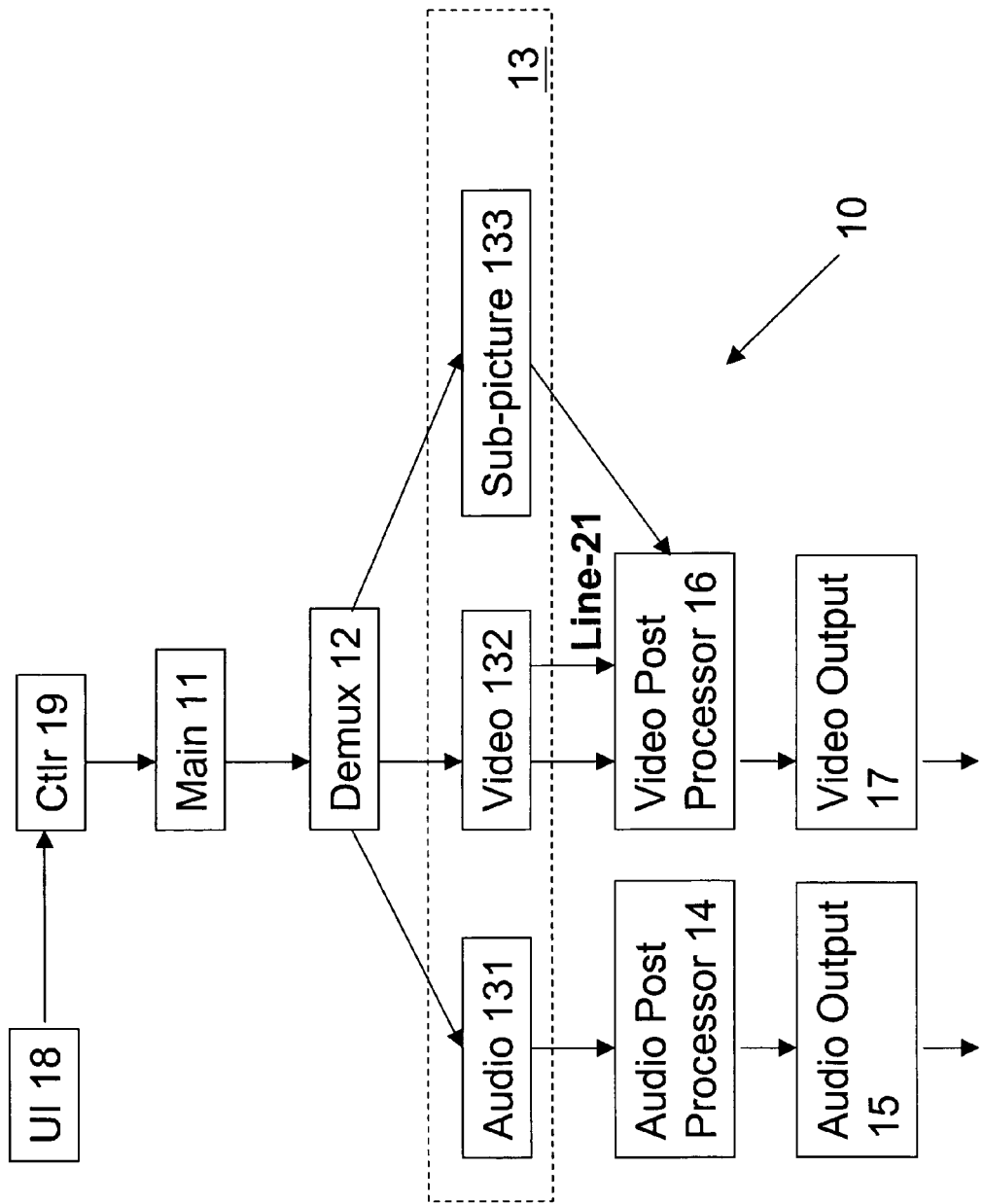
FIG. 1 is a schematic view illustrating a hardware structure of a digital video disk ("DVD") player.
Figure 2:
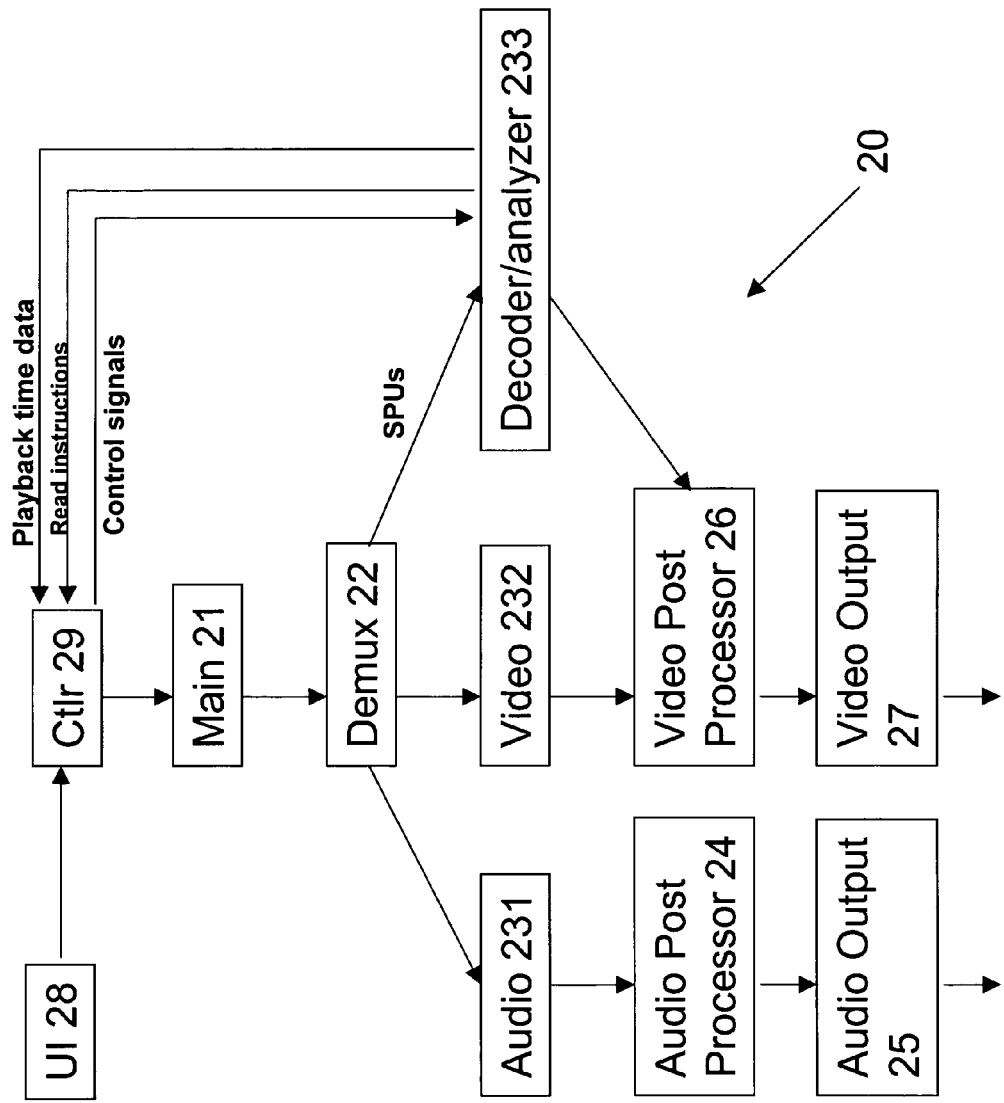
FIG. 2 is a schematic view illustrating a hardware structure of a DVD playback system consistent with the present invention.

FIG. 2 is a schematic view of a hardware structure of a digital video disk ("DVD") player 20 comprising a playback system consistent with the present invention. DVD player 20 includes a main controller 21, a de-multiplexer 22 (or "demux 22"), an audio post processor 24, an audio output 25, a video post processor 26, a video output 27, a user interface 28, a controller 29, and a decoder having audio decoder 231, video decoder 232, and subtitle analyzer and sub-picture decoder 233. After reading and processing video and audio data from a DVD or hard disk or optical storage media, main controller 21 outputs the processed data to demux 22. DVD player 20 can utilize controller 29 and play audio and video data based on user-selected subtitles. Decoder 233 receives sub-pictures from demux 22 and control signals from controller 29, outputs subtitle images to video post processor 26, and outputs display time and read instructions to controller 29.

Figure 3:
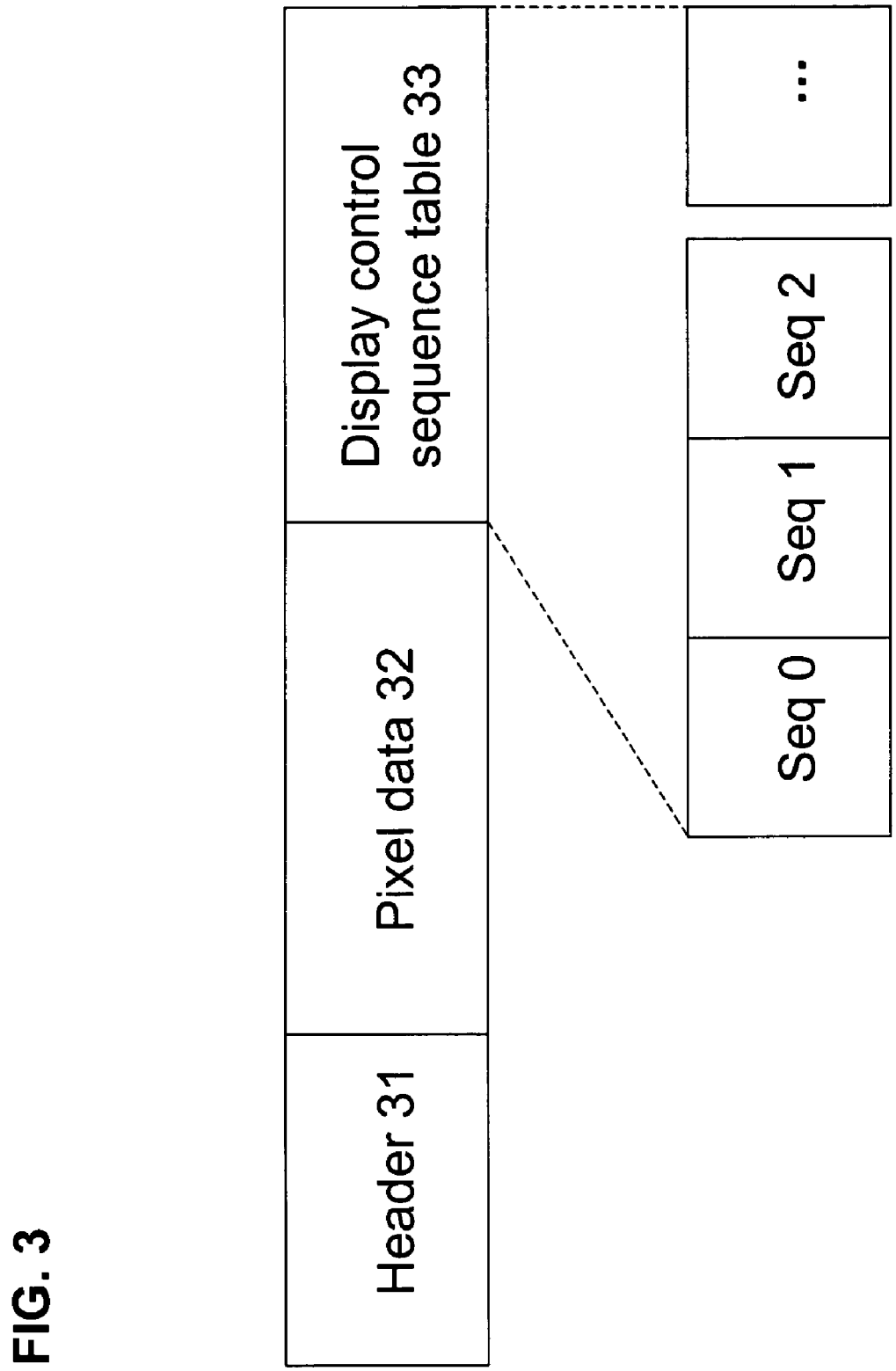
FIG. 3 is a schematic view illustrating a data structure utilized in a subtitle analyzer and sub-picture decoder in a system consistent with the present invention.

FIG. 3 is a schematic view that illustrates a data structure in decoder 233 consistent with the present invention. In DVD player 20, video and audio data are played according to the display time of subtitles. Referring to FIG. 3, a data structure consistent with the present invention includes a sub-picture unit ("SPU") header 31, pixel data 32 and a sub-picture display control sequence table 33. Table 33 includes a plurality of display sequences 0, 1, 2, . . . . As decoder 233 receives a sub-picture unit ("SPU") from demux 22 (FIG. 2), the smallest display unit for every subtitle is determined in providing control signals for displaying the subtitles. Corresponding playback time and end time data are also calculated. Thus, as control signals from controller 29 instruct a change or replay of subtitles, decoder 233 supplies corresponding playback time data to controller 29. Based on the supplied playback time data, controller 29 provides playback control signals to main controller 21 for playing audio and video data. When decoder 233 does not have playback time data requested by controller 29, decoder 233 outputs read instructions for reading an SPU through controller 29 and main controller 21 while main controller 21 temporarily suspends playing of video and audio data. Controller 29 can provide playback time data corresponding to the currently displayed subtitles, or corresponding to succeeding subtitle images.

Furthermore, in improving system efficiency and reducing the need for SPU read/write operations by decoder 233, decoder 233 can further include a memory (not shown) for storing excess SPUs therein. As audio and video data are being played, SPUs already stored in that memory can be directly provided to video post processor 26 from decoder 233.

If an end user desires to replay audio and video data corresponding to specific subtitles, that user can enter commands through user interface 28, e.g., a remote control. Controller 29 will implement those commands entered by the user. For example, when an end user wishes to replay audio and video data corresponding to a prior SPU, controller 29 provides controls signals to decoder 233. Decoder 233 then outputs playback time data corresponding to that prior SPU, e.g., start and end times. Once controller 29 receives the playback time data (start and end times), it outputs corresponding control signals to main controller 21. Main controller 21 can cause a replay of audio and video data according to those control signals.

From sub-picture display sequence data in SPUs, decoder 233 logically divides the SPUs into subtitle display units in terms of start and end times. Based on control signals from controller 29, subtitle display units are formed with the minimum length of each subtitle display unit, and corresponding display start and end times provided to controller 29. Decoder 233 can also provide read/write instructions to controller 29, which can send corresponding control signals to main controller 21 for prior and succeeding SPUs. Based on data from user interface 28 (e.g., setting the size of subtitle display units, replaying or switching subtitle display units), control data are forwarded to decoder 233. Controller 29 converts the start and end time data or SPU read/write instructions from decoder 233 and accordingly provides controls signals for audio and video playback. As decoder 233 instructs the reading of SPUs, audio and video playback can be suspended and the read SPUs provided thereto.

Figure 4A:
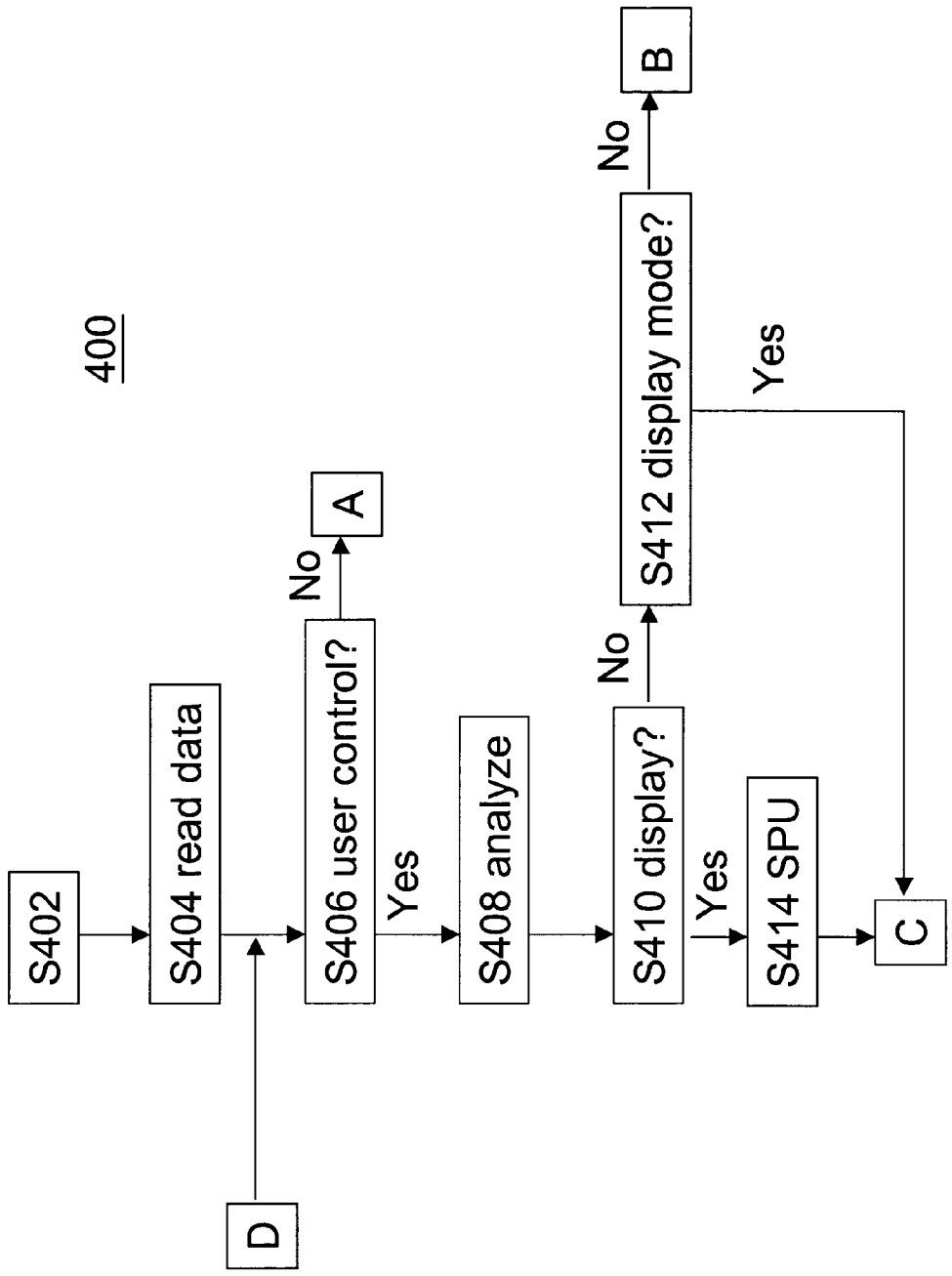
FIGS. 4A and 4B are flow diagrams illustrating a method for playback control based on subtitle display time consistent with the present invention.
Figure 4B:

FIGS. 4A and 4B are flow diagrams that illustrate a method 400 for playback control based on subtitle display time consistent with the present invention, starting at stage S402. In stage S404, audio and video data are read and a playback start position is set. Audio and video data, having subtitle display information, can come from a DVD or storage media (such as a hard drive). In stage S406, user-input control instructions are detected. If no user control instructions are received, method 400 proceeds to stage S422 through stage A. If user control instructions are received, then method 400 proceeds to stage S408. In stage S408, actions in accordance with the user control instructions are analyzed.

In stage S410, a display mode for displaying subtitles according to actions in accordance with the user control instructions is determined. If the action taken according to the user control instructions is to display, then method 400 proceeds to stage S414. If not, then method 400 proceeds to stage S412. A display mode for displaying subtitles can include switching to prior and succeeding subtitles, repeatedly displaying subtitles, replaying prior and succeeding subtitles, and any display actions based on subtitle display timing for controlling audio and video playback.

In stage S412, it is determined whether a subtitle display mode is activated. If so, method 400 proceeds to S416. If not, method 400 proceeds to stage S426 through stage B. In stage S414, SPUs are set and method 400 proceeds to stage S416 through stage C.

In stage S416, a size of subtitle display units is determined for display switching. If a size of subtitle display units is changed, method 400 proceeds to stage S424. If the size of subtitle display units is not changed, method 400 then proceeds to stage S420 instead.

In stage S420, it is determined if subtitle display had ended. If so, method 400 proceeds to stage S406 through stage D. If subtitle display has not ended, method 400 then proceeds to stage S428.

In stage S422, a size of subtitle display units is set and method 400 proceeds to S428. In stage S424, playback start and end timing for audio and video playback is determined based on subtitle switching and display time. Method 400 then proceeds to stage S428. In stage S426, normal operations for the playback system continue, and method 400 proceeds to stage S428.

In stage S428, audio and video data are played based on start time and end time for audio and video playback. This stage can be performed by an audio and video playback unit. Method 400 then proceeds to stage S406 through stage D.

Therefore, a method for audio and video playback control based on subtitle display time consistent with the present invention advantageously allows an end user to selectively replay once or multiple times the audio and video data corresponding to the subtitles.

Figure 5:
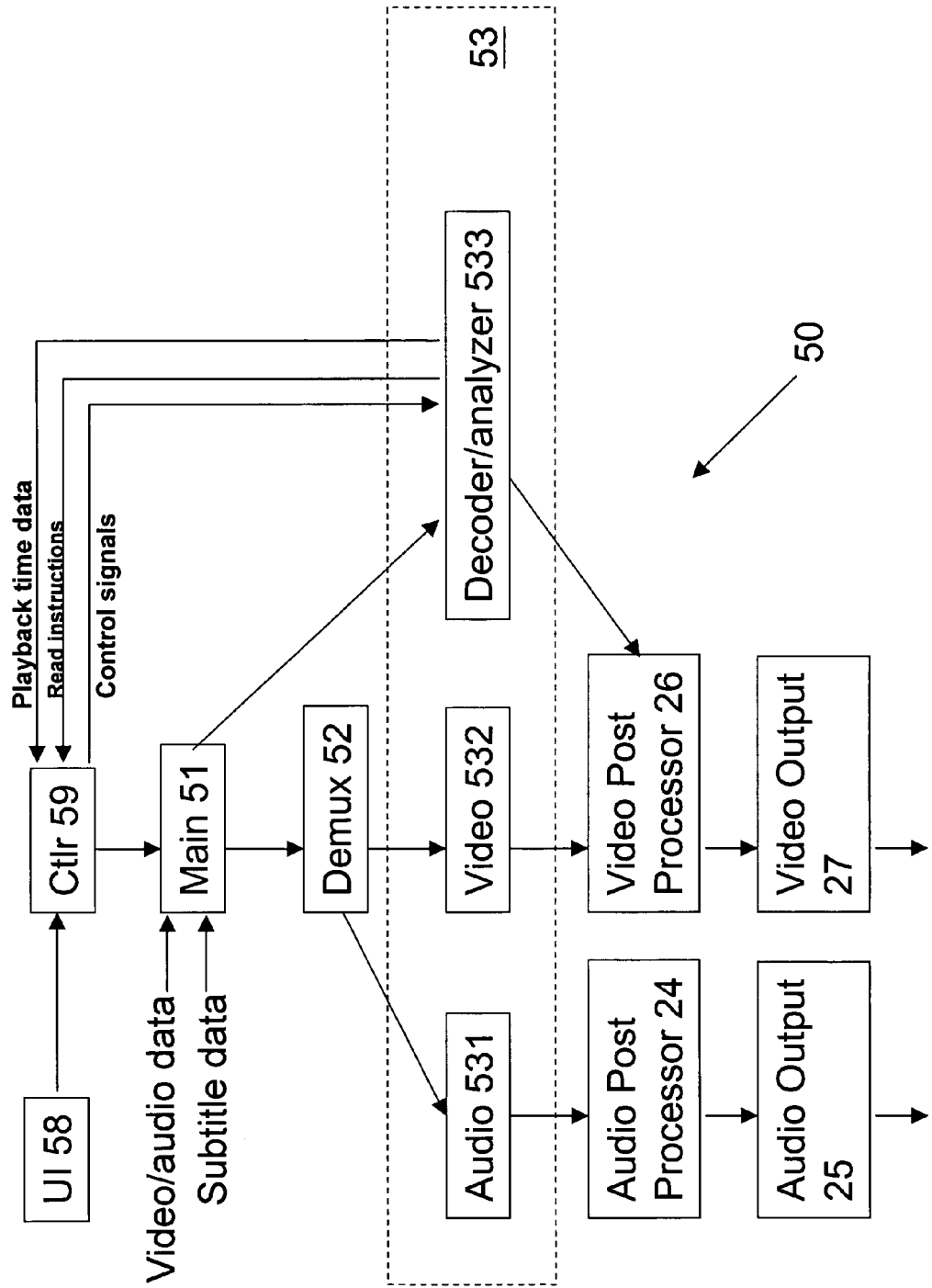
FIG. 5 is a schematic view illustrating another system having audio and video playback control based on subtitle display time consistent with the present invention.

FIG. 5 is a schematic view that illustrates another player 50 comprising a system having audio and video playback control based on subtitle display time consistent with the present invention. Audio and video player 50 (such as a DVD player) includes a main controller 51, a demux 52, a decoder 53, an audio post processor 24, an audio output 25, a video post processor 26, an audio output 27, a user interface 58, and a controller 59. Decoder 53 further includes an audio decoder 531, a video decoder 532, and a subtitle analyzer and sub-picture decoder 533. Player 50 mainly serves to provide video and audio signals, where audio and video data are read from a DVD or data storage media such as a hard drive. In contrast to the system shown in FIG. 2, main controller 51 can read external subtitle data in addition to audio and video data for playback, and accordingly provide the subtitle data to sub-picture decoder 533.

Sub-picture decoder 233 (shown in FIG. 2) determines start time and end time corresponding to every subtitle based on SPUs. Additionally, start time and end time for subtitle display can be calculated based on external subtitle data (shown in FIG. 5) having text data and start and end time for text data display or based on linguistic differences therein. Thus, sub-picture decoder 533 does not require SPUs for analyzing subtitle data. Instead, decoder 533 only needs to directly analyze external subtitle data. If the subtitle data are the SPUs, decoders 233 and 533 will have similar decoding functionalities.

Figure 6:
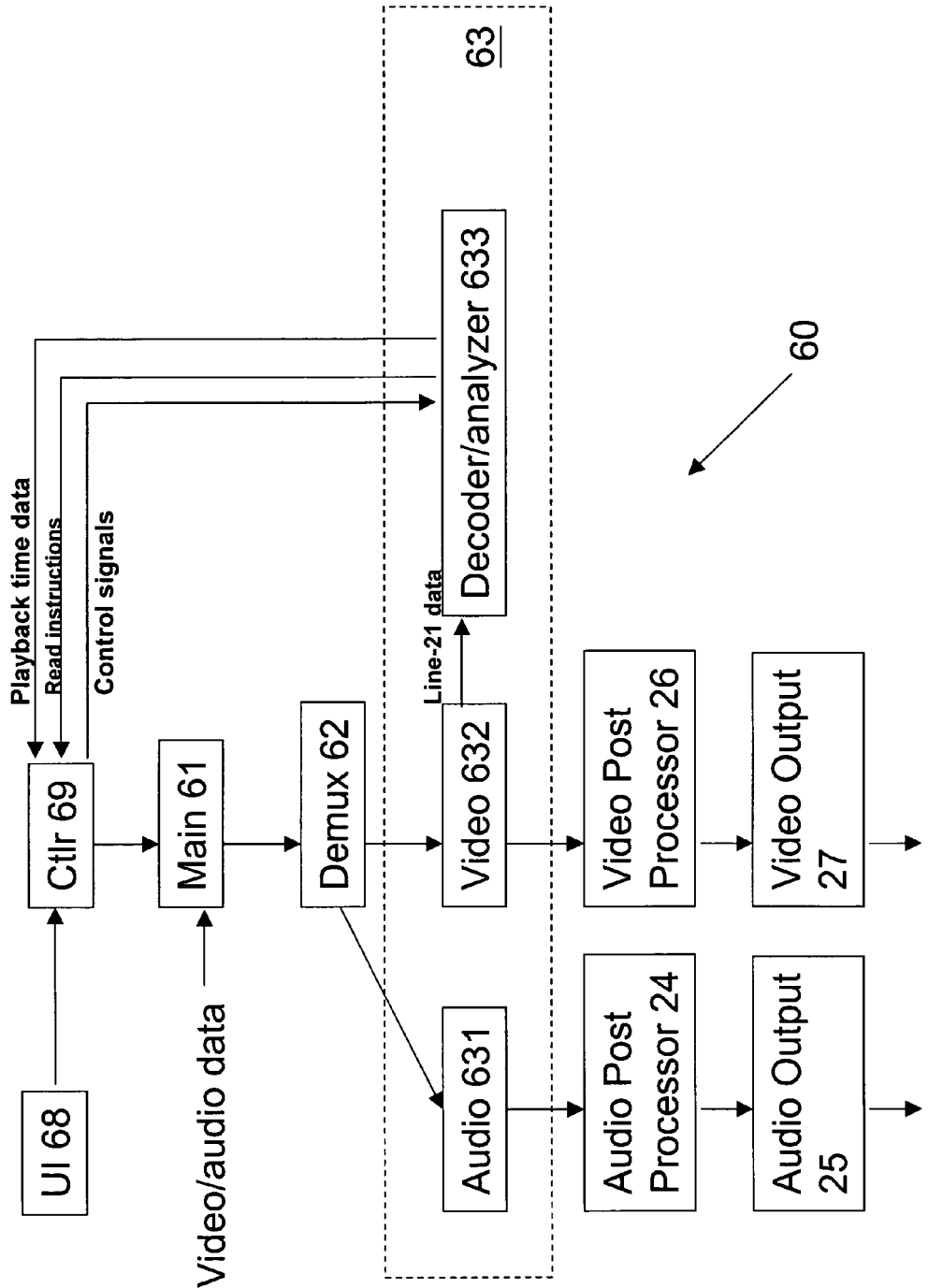
FIG. 6 is a schematic view illustrating yet another system having audio and video playback control based on subtitle display time consistent with the present invention.

FIG. 6 is a schematic view that illustrates yet another player 60 comprising a system having audio and video playback control based on subtitle display time consistent with the present invention. Audio and video player 60 (such as a DVD player) includes a main controller 61, a demux 62, a decoder 63, an audio post processor 24, an audio output 25, a video post processor 26, an audio output 27, a user interface 68, and a controller 69. Decoder 63 further includes an audio decoder 631, a video decoder 632, and a subtitle analyzer and sub-picture decoder 633. Player 60 primarily serves to provide video and audio signals, where audio and video data are read from a DVD or data storage media such as a hard drive. In contrast to the system shown in FIG. 2, video decoder 632 receives data from demux 62, which are also forwarded to sub-picture decoder 633. In one aspect, the data being forwarded from video decoder 632 to sub-picture decoder 633 can include text and display time for accompanying image frames. In another aspect, the data being forwarded from video decoder 632 to sub-picture decoder 633 can be "Line-21 data," a type of standardized format data according to Electronic Industries Association or EIA-608. Sub-picture decoder 633 decodes the Line-21 data according to EIA-608 protocol. The data from video decoder 632 to sub-picture decoder 633 can include start time for displaying data or image frames for a starter code, and an end time for images for an end code thereafter. That data will then be transformed into display time data for controller 69. Thus, decoder 633 can accordingly determine display time data corresponding to every subtitle by analyzing the Line-21 data.

With respect to Line-21, video decoder 632 retrieves display information from the Line-21 data, which are then provided to decoder 633. Line-21 data may include text data and display time information for corresponding video frames. Decoder 633 can then decode the Line-21 data according to EIA-608 protocol or other associated standardized protocols. The start time for Line-21 data may include display time for the Line-21 data or start codes for corresponding video frames. The end time for Line-21 data may include display time for the Line-21 data or end codes for corresponding video frames. Display time data corresponding to SPUs are then formed from the start time and end time information. Therefore, decoder 633 is able to decode display time data corresponding to every subtitle from the Line-21 data.

Figure 7:
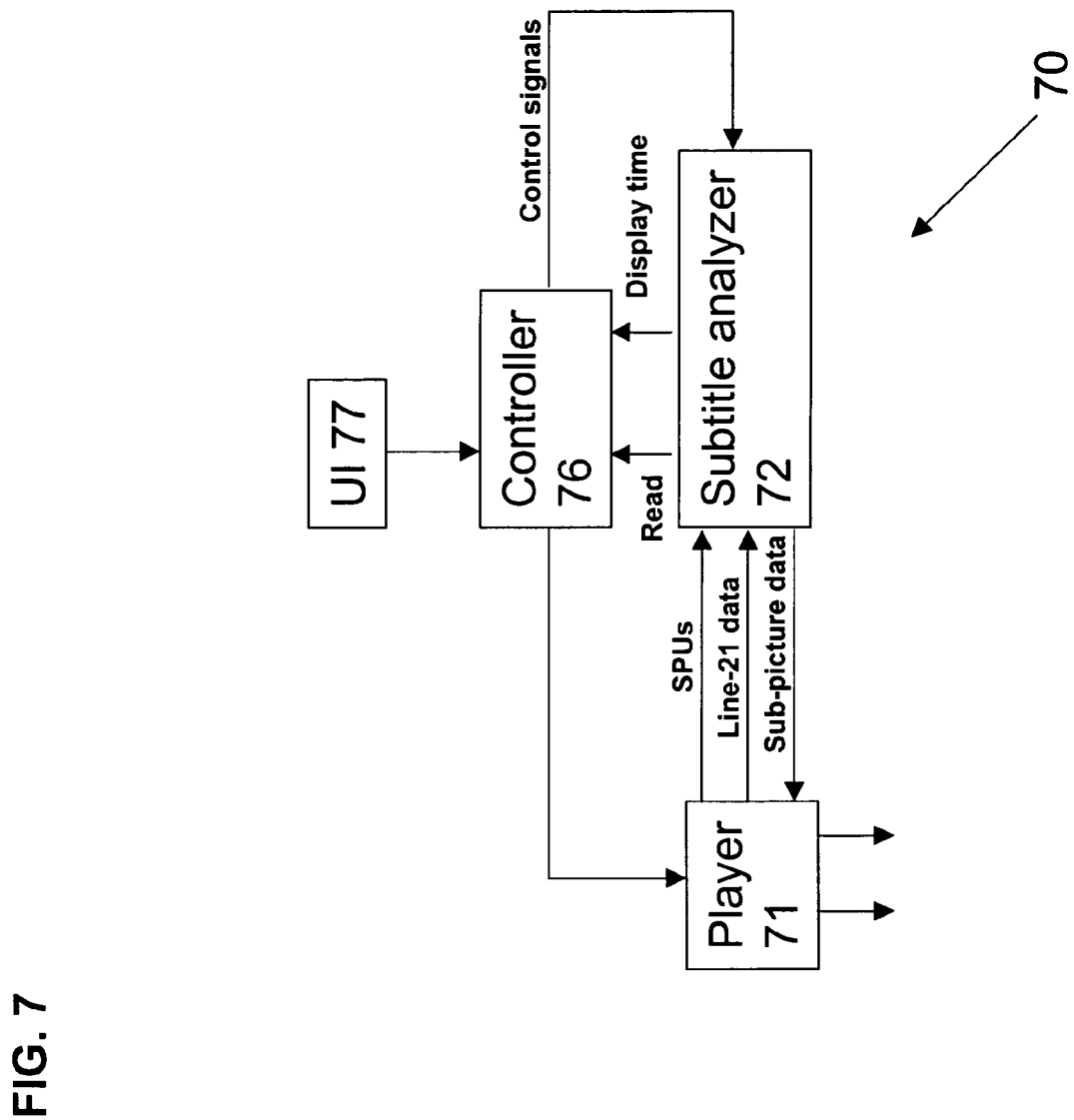
FIG. 7 is a schematic view illustrating still another system having audio and video playback control based on subtitle display time consistent with the present invention.

FIG. 7 is a schematic view that illustrates a system 70 having audio and video playback control based on subtitle display time consistent with the present invention. System 70 has a single player unit 71 that includes main controller 21, demux 22, audio post processor 24, audio output 25, video post processor 26, video output 27, and a decoder having at least sub-picture decoder 233 as shown in FIG. 2. System 70 further includes a user interface 77 and a controller 76. In system 70, SPUs can then be implemented in a DVD player having playback functionalities based on subtitle display time consistent with the present invention.

A subtitle analyzer 72 receives SPUs and data from player unit 71, and provides a corresponding playback time to controller 76. The data received in the subtitle analyzer 72 from player unit 71 can be "Line-21 data," a type of standardized format data in DVD according to Electronic Industries Association or EIA-608. Therefore, subtitle analyzer 72 can determine playback time corresponding to subtitles based on SPUs, or based on Line-21 data. In addition, if player unit 71 is coupled to receive external subtitle data, then subtitle analyzer 72 can also receive that subtitle data and accordingly determine playback time corresponding to the subtitles.

In order to optimize system efficiency and reduce the number of read operations for SPUs, a memory (not shown in FIG. 7) can also be provided in subtitle analyzer 72 for storing a large number of SPUs. For video and audio data playback, subtitle analyzer 72 can directly provide subtitle images corresponding to the SPUs to player unit 71 from such a memory device.

With respect to Line-21, subtitle analyzer 72 receives the SPUs and Line-21 data from player unit 71 (when audio and video data include Line-21 data), and provides display time corresponding to the subtitles to controller 76. Thus, subtitle analyzer 72 may determine the display time corresponding to the subtitles being displayed based on the SPUs, or based on the Line-21 data. In addition, if player unit 71 can receive external subtitle information, then subtitle analyzer 72 can also receive such external subtitle information, and accordingly determine display time corresponding to subtitles being displayed.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A playback system for playing video data and audio data and displaying subtitles, the system comprising:
 a subtitle analyzer for analyzing the subtitles and providing subtitle start and end times of each of the subtitles;
 a video decoder for decoding the video data;
 an audio decoder for decoding the audio data; and
 a player for playing the decoded video data and the decoded audio data based on the subtitle start and end times of each of the subtitles.

2. The system of claim 1 further comprising:
 a controller for providing playback control signals based on the subtitle start and end times from the subtitle analyzer; and
 a demultiplexer for receiving the video data, the audio data and the playback control signals and outputting the video data to the video decoder and the audio data to the audio decoder;
 wherein the controller reads the video data and the audio data.

3. The system of claim 1 further comprising:
 a sub-picture decoder;
 a main controller for reading the video data, the audio data and providing sub-picture units for the video data; and
 a demultiplexer for receiving the video data, the audio data and the sub-picture units from the main controller and outputting the video data to the video decoder, the audio data to the audio decoder, and the sub-picture units to the sub-picture decoder.

4. The system of claim 3 further comprising a data structure in the sub-picture decoder having a sub-picture unit header, pixel data and a plurality of sub-picture display control sequences.

5. The system of claim 1 further comprising Line-21 data in the video data provided to the subtitle analyzer for analyzing the Line-21 data and providing the subtitle start and end times.

6. The system of claim 1 further comprising:
a main controller for reading the video data, the audio data and providing external subtitle data corresponding to the subtitles to the subtitle analyzer; and
a demultiplexer for receiving the video data and the audio data from the main controller and outputting the video data to the video decoder and the audio data to the audio decoder.

7. The system of claim 1 further comprising a video processor for processing the decoded video data, and an audio processor for processing the decoded audio data.

8. The system of claim 1 further comprising a video output for outputting video output signals, and an audio output for outputting audio output signals.

9. The system of claim 1 further comprising external subtitle data provided to the subtitle analyzer for analyzing the subtitles and providing the subtitle start and end times.

10. The system of claim 1 further comprising Line-21 data in the video data wherein the video decoder decodes the Line-21 data and outputs the decoded data to the subtitle analyzer.

11. A playback system for playing video data and audio data and displaying subtitles, the system comprising:
a sub-picture decoder having a plurality of sub-pictures corresponding to the video data, and for analyzing the subtitles and providing subtitle start and end times of each of the subtitles;
a video decoder for decoding the video data;
an audio decoder for decoding the audio data; and
a player for playing the decoded video data and the decoded audio data based on the subtitle start and end times of each of the subtitles.

12. The system of claim 11 further comprising:
a controller for providing playback control signals based on the subtitle start and end times from the sub-picture decoder; and
a demultiplexer for receiving the video data, the audio data and the playback control signals and outputting the video data to the video decoder and the audio data to the audio decoder;
wherein the controller reads the video data and the audio data.

13. The system of claim 11 further comprising:
a main controller for reading the video data, the audio data and providing the sub-picture units; and
a demultiplexer for receiving the video data, the audio data and the sub-picture units from the main controller and outputting the video data to the video decoder, the audio data to the audio decoder, and the sub-picture units to the sub-picture decoder.

14. The system of claim 11 further comprising a data structure in the sub-picture decoder having a sub-picture unit header, pixel data and a plurality of sub-picture display control sequences.

15. The system of claim 11 further comprising a user interface coupled to the controller for receiving user instructions.

16. The system of claim 11 further comprising:
a main controller for reading the video data, the audio data and providing external subtitle data corresponding to the subtitles to the sub-picture decoder; and
a demultiplexer for receiving the video data and the audio data from the main controller and outputting the video data to the video decoder and the audio data to the audio decoder.

17. The system of claim 11 further comprising a video processor for processing the decoded video data, and an audio processor for processing the decoded audio data.

18. The system of claim 11 further comprising a video output for outputting video output signals, and an audio output for outputting audio output signals.

19. The system of claim 11 further comprising external subtitle data provided to the sub-picture decoder for analyzing the subtitles and providing the subtitle start and end times.

20. The system of claim 11 wherein the player outputs the subtitles and Line-21 data corresponding to the subtitle start and end times.

21. A method in a playback system for playing video data and audio data and displaying subtitles, the method comprising:
analyzing the subtitles and providing subtitle start and end times of each of the subtitles;
decoding the video data and the audio data; and
playing the decoded video data and the decoded audio data on the playback system, based on the subtitle start and end times of each of the subtitles.

22. The method claim 21 further comprising:
providing playback control signals based on the subtitle start and end times; and
demultiplexing the video data, the audio data and the playback control signals and outputting the video data and the audio data for the decoding.

23. The method of claim 21 further comprising:
providing sub-picture units for the video data; and
demultiplexing the video data, the audio data and the sub-picture units and outputting the video data and the audio data for the decoding; and
sub-picture decoding the sub-picture units.

24. The method of claim 23 further comprising providing a sub-picture unit header, pixel data and a plurality of sub-picture display control sequences for the sub-picture decoding.

25. The method of claim 21 further comprising outputting the subtitles and Line-21 data corresponding to the subtitle start and end times.

26. The method of claim 21 further comprising:
providing external subtitle data corresponding to the subtitles; and
demultiplexing the video data and the audio data and outputting the video data and the audio data for the decoding.

27. The method of claim 21 further comprising video processing the decoded video data and audio processing the decoded audio data.

28. The method of claim 21 further comprising providing external subtitle data corresponding to the subtitles.

29. The method of claim 21 further comprising providing a user interface for receiving user instructions.

30. The method of claim 21 further comprising determining a start time and end time for the playing of the video data and the audio data.

* * * * *